US008484503B2

(12) United States Patent
Akirav et al.

(10) Patent No.: US 8,484,503 B2
(45) Date of Patent: Jul. 9, 2013

(54) DISASTER RECOVERY REPLICATION THROTTLING IN DEDUPLICATION SYSTEMS

(75) Inventors: Shay H. Akirav, Petach-Tikva (IL); Yariv Bachar, Ma'abarot (IL); Dov N. Hepner, Hertzelyia (IL); Ofer Leneman, Kfar Saba (IL); Gil E. Paz, Yehud (IL); Tzafrir Z. Taub, Givaataim (IL)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 12/858,679

(22) Filed: Aug. 18, 2010

(65) Prior Publication Data

US 2012/0047392 A1    Feb. 23, 2012

(51) Int. Cl.
*G06F 11/00* (2006.01)

(52) U.S. Cl.
USPC ..................................... 714/3; 714/2; 714/4.1

(58) Field of Classification Search
USPC .......................................... 714/2, 5, 4.11, 6.3
See application file for complete search history.

(56) References Cited

U.S. PATENT DOCUMENTS

| | | | |
|---|---|---|---|
| 5,615,329 A * | 3/1997 | Kern et al. .................... | 714/6.12 |
| 6,442,706 B1 | 8/2002 | Wahl et al. | |
| 7,103,797 B1 | 9/2006 | Wahl et al. | |
| 7,117,386 B2 | 10/2006 | LeCrone et al. | |
| 7,392,421 B1 | 6/2008 | Bloomstein et al. | |
| 7,487,282 B2 * | 2/2009 | Leach ............................ | 710/305 |
| 2011/0078494 A1 * | 3/2011 | Maki et al. .................... | 714/6.12 |
| 2011/0107135 A1 * | 5/2011 | Andrews et al. .................. | 714/2 |

FOREIGN PATENT DOCUMENTS

JP      2005293325 A    10/2005

OTHER PUBLICATIONS

"CommVault Simpana Replication Software—Optimized Data Protection and Recovery for Datacenter or Remote/Branch Office Environments,", CommVault, 2008-2009, 7 pages.
Laura Dubois et al., "Backup and Recovery: Accelerating Efficiency and Driving Down IT Costs Using Data Deduplication," IDC #221849, Feb. 2010, 16 pages.
Zhu Jianfeng et al., "A duplicate-aware data replication," 2008 Japan-China Joint Workshop on Frontier of Computer Science and Technology, IEEE 978-0-7695-3540-01/08, 2008, pp. 112-117.

* cited by examiner

*Primary Examiner* — Scott Baderman
*Assistant Examiner* — Sarai Butler
(74) *Attorney, Agent, or Firm* — Griffiths & Seaton PLLC (57) ABSTRACT

Communication is arrested between a source data entity and a replicated data entity at a location declared in a DR mode. The DR mode is negotiated to a central replication management component as a DR mode entry event. The DR mode entry event is distributed, by the central replication management component, to each member in a shared group. The DR mode is enforced using at least one replication policy.

14 Claims, 9 Drawing Sheets

DISASTER RECOVERY REPLICATION THROTTLING IN DEDUPLICATION SYSTEMS

BACKGROUND OF THE INVENTION

1. Field of the Invention

The present invention relates in general to computers, and more particularly to apparatus, method and computer program product embodiments for disaster recovery (DR) replication throttling in deduplication systems in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

Computing environments better known as deduplication systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. Such fault tolerance and wide availability is increasingly demanded. For example, replication may be used in certain disaster recovery (DR) scenarios to retain data security and data access. While several existing approaches may be used to perform data replication, and specifically, replication of deduplicated data entities, these approaches have accompanying limitations that negatively affect replication efficiency, system performance and data consistency, require additional overhead, or a combination of the above.

SUMMARY OF THE INVENTION

In situations where a prolonged failure of a primary computing storage environment (such as a virtual tape storage facility) occurs, a disaster recovery (DR) plan is typically executed to ensure data integrity at the remote/secondary site with minimal recovery point objective (RPO). However, once the primary system is revived, data from the primary system could not be replicated freely to the secondary system until a synchronization operation occurs that reconciles the changes that occurred while the primary storage environment was inoperable or otherwise not fully functional. Moreover, a DR test mode is unable to allow replication of primary site changes to the secondary while testing DR plan execution at the secondary site.

The issues described above are generally not addressed by conventional replication systems. As a result, use of these conventional solutions causes an inability to conduct DR test procedures in a production environment. In addition, data loss may potentially result given that the secondary site may have incurred changes that would be overwritten by the primary site when running system recovery operations. Accordingly, a need exists for a mechanism in a data replication environment for addressing the issues previously described.

In view of the foregoing, various embodiments for disaster recovery (DR) replication throttling in a computing environment are provided. In one embodiment, by way of example only, communication is arrested between a source data entity and a replicated data entity at a location declared in a DR mode. The DR mode is negotiated to a central replication management component as a DR mode entry event. The DR mode entry event is distributed, by the central replication management component, to each member in a shared group. The DR mode is enforced using at least one replication policy.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
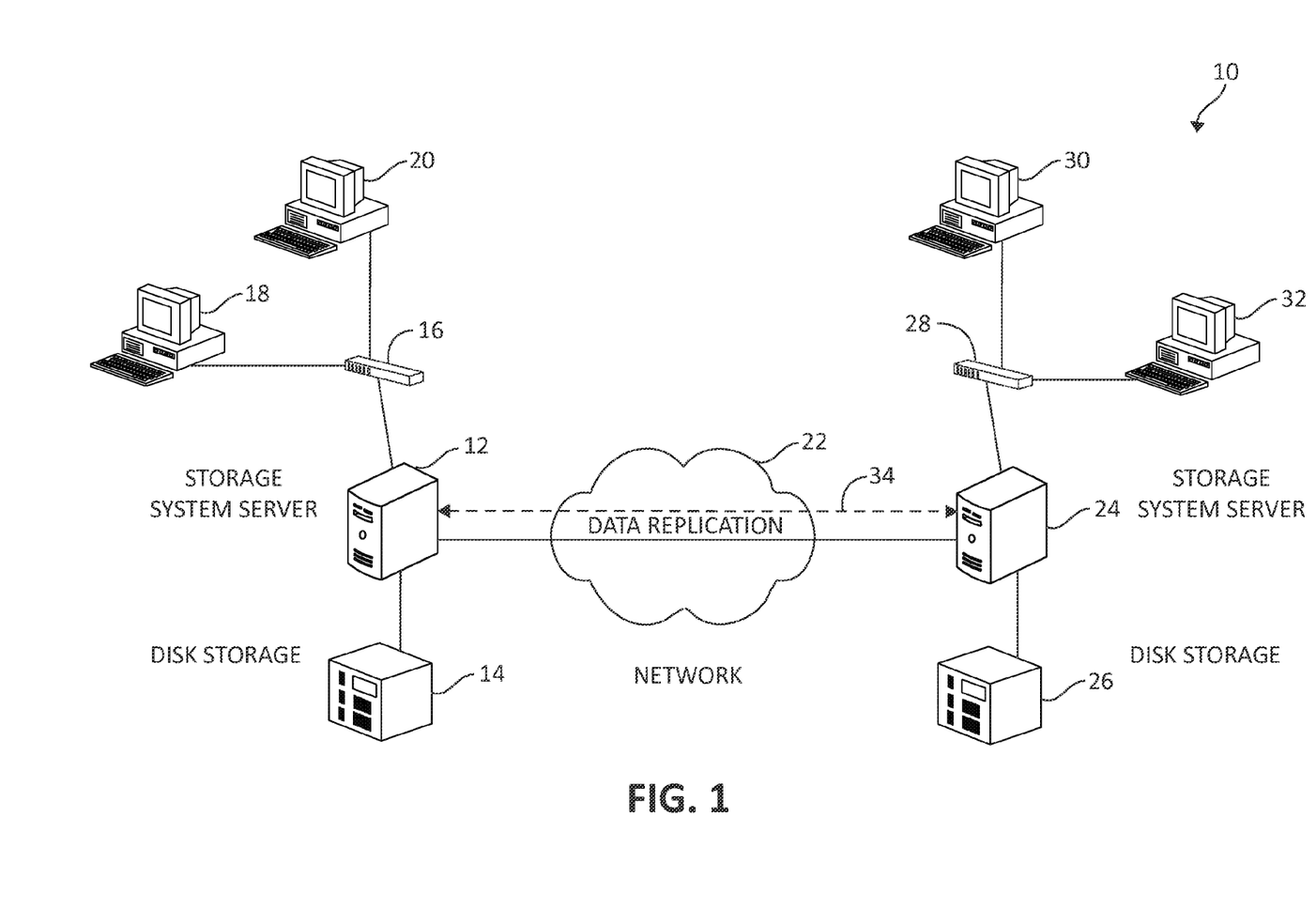
FIG. 1 illustrates an exemplary computing environment in which aspects of the present invention may be implemented.
Figure 2:
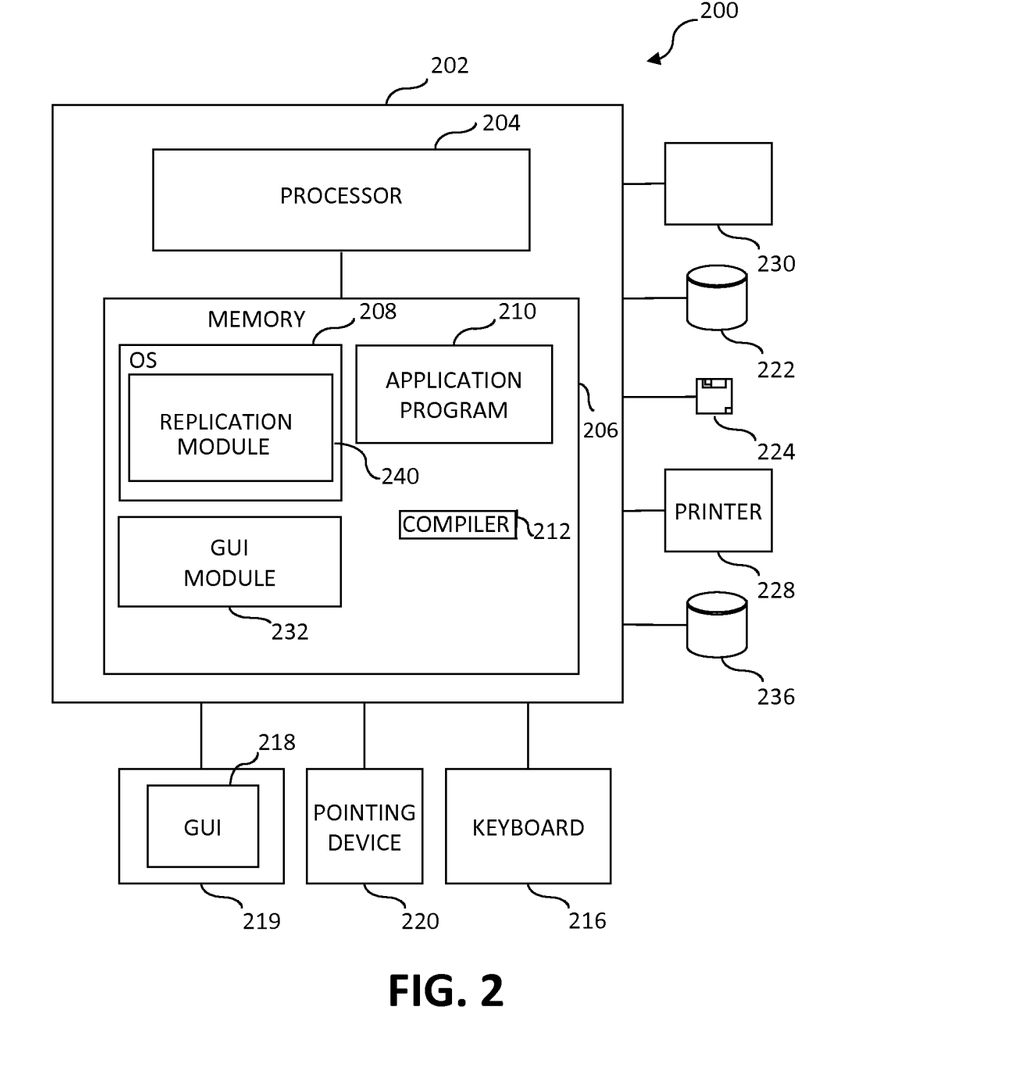
FIG. 2 illustrates an exemplary portion of a replication system as illustrated in FIG. 1, previously, including a processor device.

Turning now to FIG. 1, an exemplary architecture 10 of a computing environment in which various aspects of the present invention and following claimed subject matter is depicted. In the depicted embodiment, architecture 10 is implemented for deduplicated data replication across a network 20 as shown. While architecture 10 is depicted as an exemplary computing environment, on of ordinary skill in the art will appreciate that a variety of computing environments may implement various aspects of the present invention. In fact, any computing environment containing some form of a scheduling system or performing some scheduling functionality may implement at least one or more aspects of the present invention.

Returning to the depicted embodiment, architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18. A network 20 connects such deduplication systems 30 and routers 32. Network 20 may, in one embodiment, include a wide area network (WAN). In other embodiments, network 20 may include local area networks (LANs), storage area networks (SANs), and other network topologies known to the one of ordinary skill in the art. While routers 32 and switches 28 are shown, the one of ordinary skill in the art will also appreciate that additional and/or substitute networking components are contemplated.

In one embodiment, switch 28 is compliant with a fiber channel network protocol, making the switch 28 and interconnected components capable of executing commands such as small computer systems interface (SCSI) commands. Such commands may be executed for a variety of storage devices, again as the one of ordinary skill in the art will appreciate, such as disk drives, tape devices, solid state devices (SSDs), and the like.

Figure 3A:
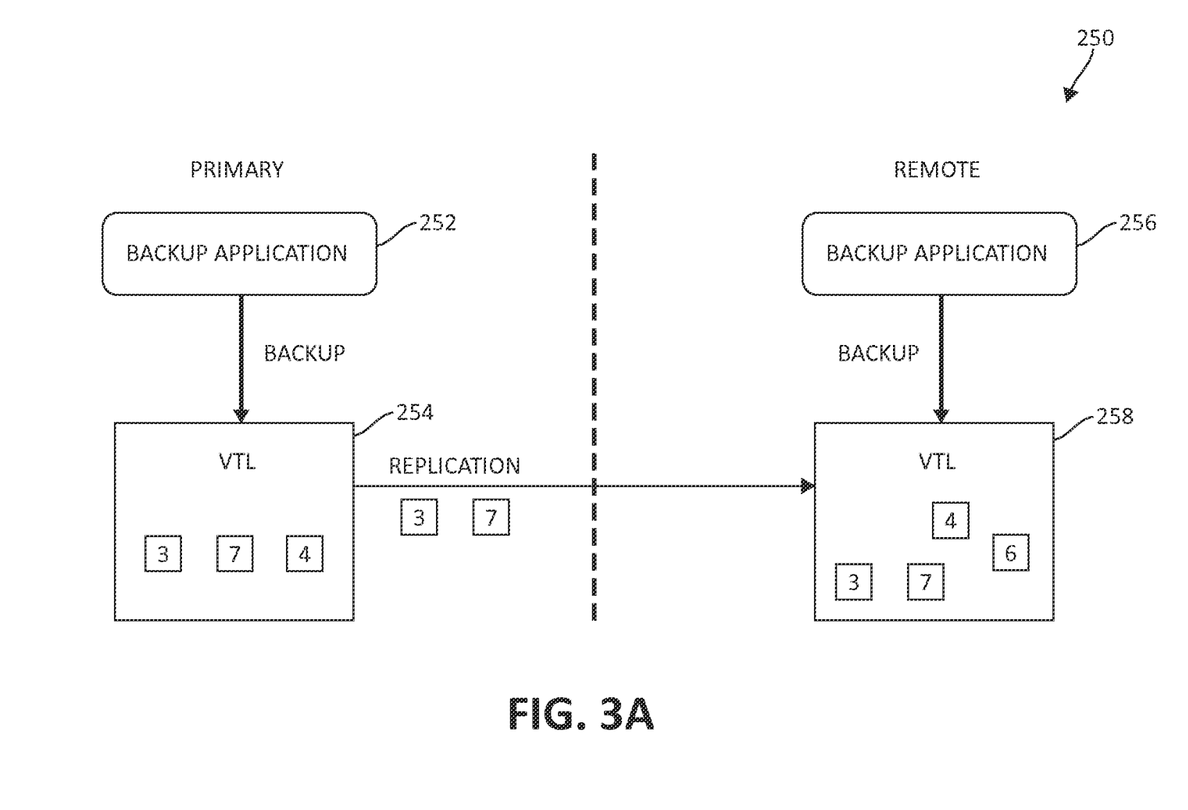
FIG. 3A illustrates exemplary replication between two data storage facilities, here embodied as virtual tape libraries (VTLs)

As mentioned previously, current DR replication mechanisms fail to address various scenarios where, following a prolonged failure of a first data storage system, synchronization between the first and a second data storage system is needed to ensure data integrity, for example. Turning to FIG. 3A, exemplary replication 250 is shown between a primary system with a backup application 252 writing backup data to a first storage facility 254 (here embodied as a virtual tape library, or VTL), and a remote system, also having a backup application 256 writing backup data to a second storage facility 258. In the illustrated scenario, a one-to-one replication operation of three objects (3, 7, and 4) is depicted, and the primary facility 254 suffers a prolonged failure before replicating object 4.

As further illustrated, object 3 had fully passed, object 7 failed after replicating some data, and object 4 was not replicated at all. The remote system working as production has now created objects 6 and 4, and wrote additional data on object 7. In the depicted scenario, synchronization is necessary in order to not mix objects 4 from the two sites (254 and 258), and object 7 is in danger of suffering data loss.

Figure 3B:
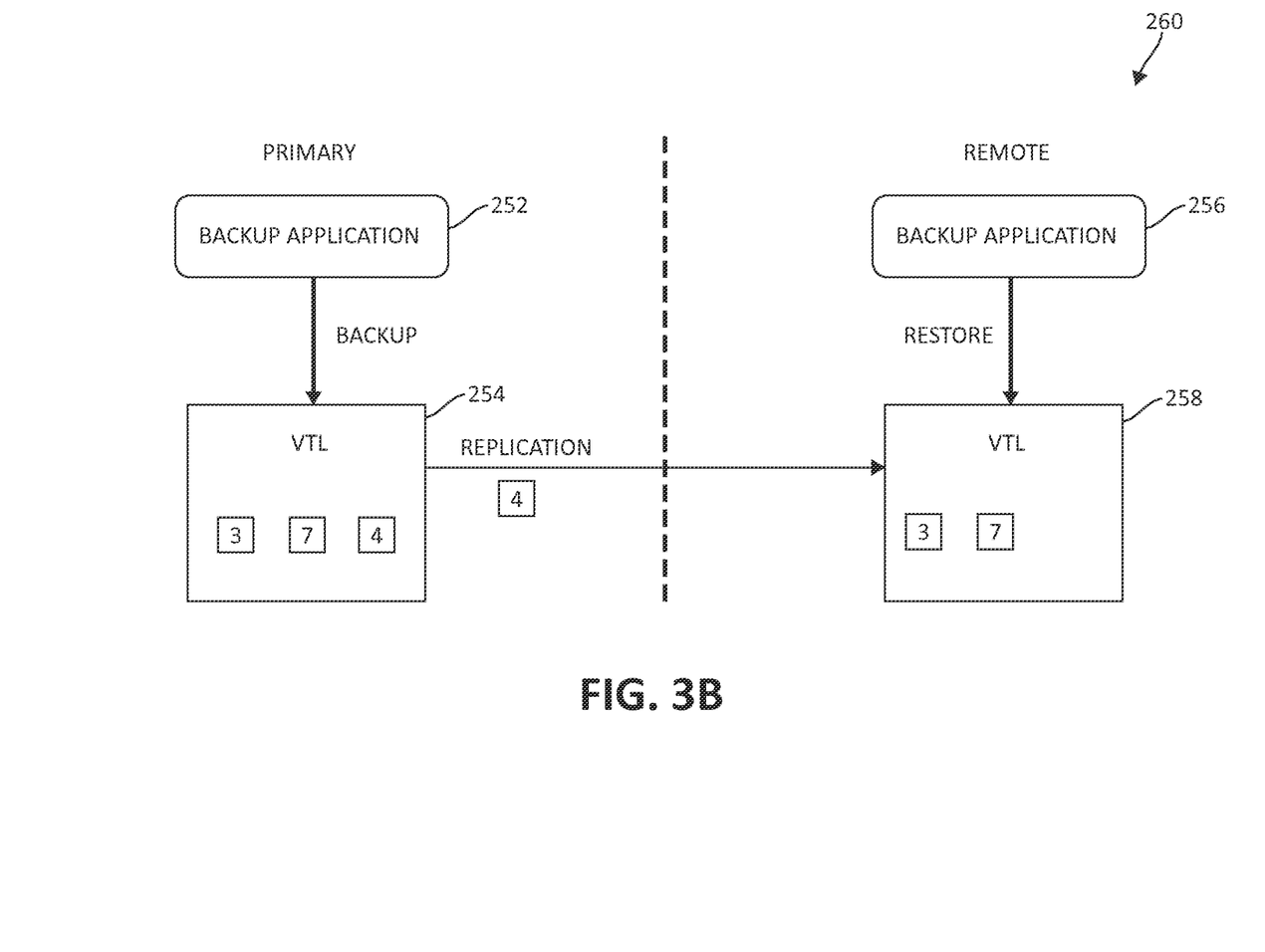
FIG. 3B illustrates additional exemplary replication between the two data storage facilities.

Turning to FIG. 3B, additional exemplary replication 260 is shown between the two data storage facilities first illustrated in FIG. 3A previously. Here again, backup applications 252 and 256 are shown, as are virtual tape libraries 254 and 258. In the depicted scenario, a disaster recovery (DR) test is being conducted at the remote site before object 4 is replicated. The primary system 254 has replicated object 3 to the remote system 258. The primary system 254 is currently replicating object 7 to remote system 258. A user, such as a system administrator, has decided to execute a DR test procedure on the remote site. Accordingly, the user requires a static snapshot of the objects' status.

In the depicted scenario, and in light of the above, object 7 will continue to change, and object 4 will later be created, which would cause the remote environment to be dynamic, rather than static. This scenario presents a potential problem, since a remote site restore operation may fail if a restore is attempted from a currently replicating object.

The following illustrated embodiments provide mechanisms for, at least temporarily, pausing replication to a system (such as a remote site as presently depicted) declared as being in a DR mode (such as a test procedure). In one embodiment, the declaration of entering a DR mode is performed by a remote system administrator in his own system, for example. In one of the illustrated embodiments, the DR mode status is received and heuristically attempted to distribute to fellow members of the applicable replication group. If, for example, a particular DR mode was entered in order to allow for DR test procedures at a particular location, the opposing location (such as the primary location) will also block its outgoing replication activities to the specific system under test. Accordingly, replication will not reach the tested system, and a stasis state is achieved at the test location regarding the specific opposing system.

As a result, the test location may proceed with DR test procedures, or alternatively, move production and begin work. Once the particular failure is overcome, or the DR test procedures have concluded, the DR mode notification may then be halted. If, in the case of a DR test procedure, the opposing system may select to recover prior replication activity and begin replication again from the point that it had stopped earlier before such testing activity commenced. In cases of a system failure, alternatively, a situation may arise where there is no data to speak of, or partial data exists. In this situation, the mechanisms of the present invention provide a means for synchronizing objects from the failed site to the source site (or vice-versa) in a coordinated way using, for example, the reverse path of the defined replication path. Additionally, the user may also choose to allow the tested or failed system to take control of the replica objects.

In one exemplary method of operation, the mechanisms of the present invention may operate as follows pursuant to entrance of a location into a DR mode (again as a result of testing operations or failure). In the described example, the two data storage systems undergoing replication are described in terms of a "source" system and a "remote" system, although one of ordinary skill in the art will appreciate that other designations may be also be applicable. In a first step in the instant exemplary method, the user decides as part of disaster recovery or disaster recovery test operations to enter its system into a DR mode. The user chooses the source system in which its system is now being declared the DR system for. Communication is blocked at the remote system receiver end. The applicable DR mode status is negotiated to a central replication management component, as will be further described. The central replication management component distributes the DR mode status to all members in the same group as the remote system as an entry event. If the primary system is up and is connected to the central replication management component, the primary system will then receive the DR mode event and block outgoing communication towards the specific remote system on the primary system side.

Once the DR mode event is communicated to all members in the replication group, the DR mode of operation is enforced for as long as the applicable DR mode is set. To this regard, the following terminology may be helpful. First, a "central replication component" as was previously described may be intended to refer to a component that controls the configuration of replication grids. A "distribution mechanism" may be intended to refer to a central replication component mechanism on a best-effort basis for distributing status changes in a replication grid to all available members. A "DR test" may be intended to refer to a process that may include a number of testing procedures that are user-defined, and meant for testing readiness for handling disasters. A "grid status map" may be intended to refer to a value, below which the calculated factoring ratio equals the configured factoring ratio. "Replication" may be intended to refer to the process of incrementally copying deduplicated data between systems that reside in the same replication grid. Finally, a "replication grid" may be intended to refer to a logical group providing a context in which a replication operation may be established between different physically connected members.

In one exemplary embodiment, to enforce the applicable DR mode of operation while set, one or more replication policies are followed between replication systems. For example, the following replication policies may be applicable in the context of the source/primary and remote system nomenclature previously described while the primary system is in the process of recovery. First, in the case that a retry period for some objects have not expired, old requests are queued for replication. Second, in the case that primary production writes occur on new objects, new requests are queued for replication. Third, in the case that primary production writes occur on old objects, new requests are queued for replication on objects that were not fully replicated to the remote site at the time the failure occurred. Fourth, if the connection to the central replication component was established, replication is halted from commencing, and all requests remain queued according to their retry status, else replication is sent to the remote system (e.g., replication of multiple objects takes place). Finally, because replication activities are rejected from the DR source, replication will fail at the primary/source site since replication is blocked in the remote system. As one of ordinary skill in the art will appreciate, other replication policies may be applicable in a particular situation and may be enforced in a similar fashion to the foregoing.

In one exemplary embodiment, and in view of the foregoing, the remote system may be adapted to not allow changing read-only replica objects to write enabled. In addition, the remote system may be adapted to allow for failback/takeover operations.

In one exemplary method of operation, the mechanisms of the present invention may operate as follows pursuant to exit of a location from the applicable DR mode (again as a result of testing operations or failure). Again, in the described example, the two data storage systems undergoing replication are described in terms of a "source" system and a "remote" system, although one of ordinary skill in the art will appreciate that other designations may be also be applicable. In a first step in the instant exemplary method, the user makes a determination to exit the applicable DR mode, since the DR testing has concluded or the applicable failure has been corrected. Next, the user chooses the source system in which its system is declared the DR system for. The DR mode is negotiated to the central replication management component, again operational as previously described. In a manner similar to that previously described, the central replication management component then distributes the applicable DR mode (here, an exit instead of an entrance event) to all members in the replication group as a DR exit event. Finally, if the primary system is operational, and is connected to the central replication management component, the primary system will receive the DR mode exit event and re-establish outgoing communication towards the specific remote system on the primary system side.

Figure 4A:
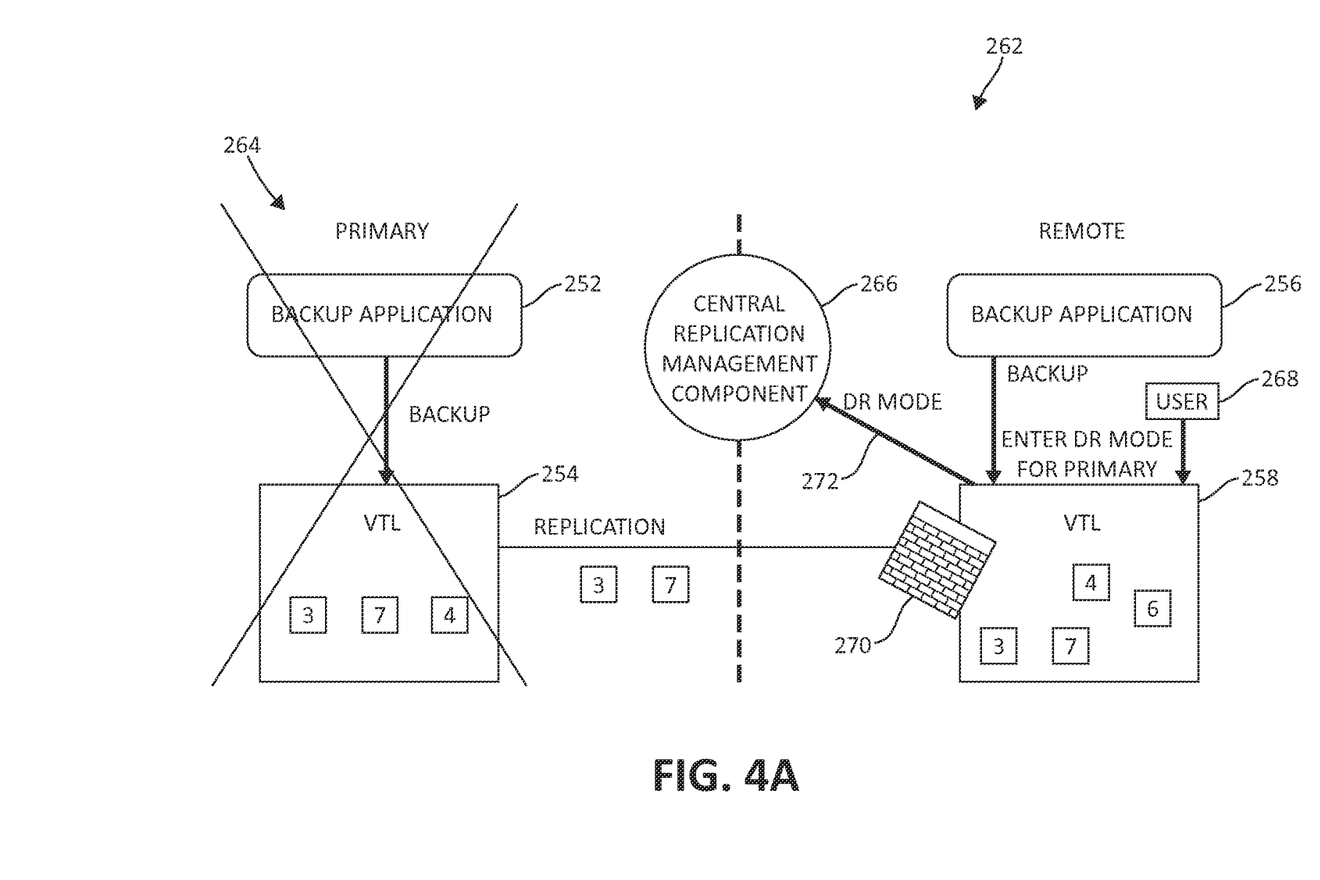
FIG. 4A illustrates exemplary replication between the two data storage facilities, in which various aspects of the present invention and following claimed subject matter may be illustrated.

Turning now to FIG. 4A, exemplary replication 262 is shown incorporating various aspects of the present invention and following claimed subject matter. FIGS. 4A-5B are labeled in terms of a primary and remote site as described in similar fashion in the examples previously. Here again as before, components 252-258 are shown. As denoted by the large "X," the primary/source system is inoperable (and as denoted by arrow 264). The remote system user 268 enters a DR mode of operation for the down primary system 264. The DR mode status is sent (as indicated by arrow 272) to the central replication management component 266, and a firewall 270 is configured in place to halt all incoming replication activity from the primary system. In the present scenario 262, if the primary system 264 were to become operational and try to recover its replication activity (such as that currently shown with regard to objects 3 and 7), the replication would be rejected by the remote system due to the firewall 270. The user 268 may now backup on new objects at the remote system. Accordingly, objects 4, 6, and 7 are backed up on by the backup application 256 on the remote system as shown.

Figure 4B:
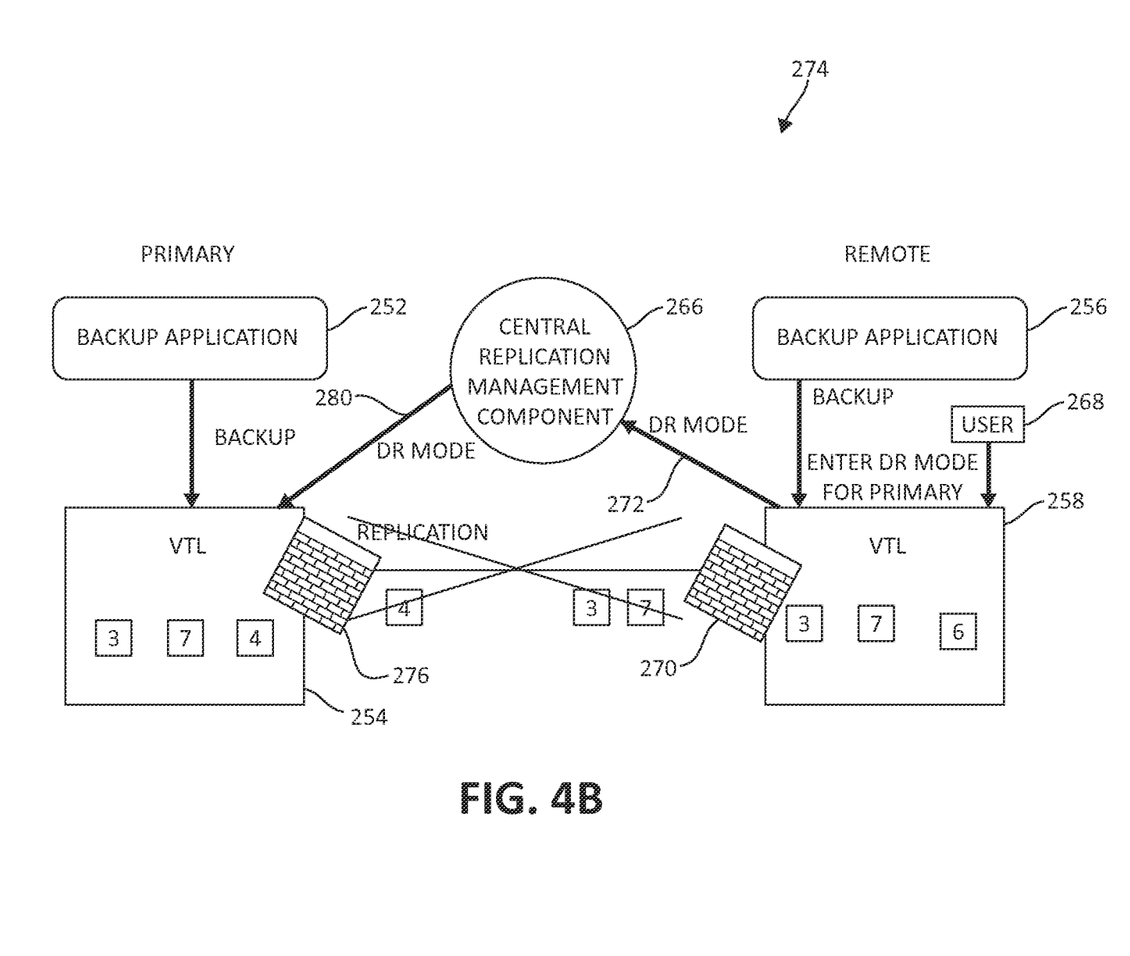
FIG. 4B illustrates additional exemplary replication between the two data storage facilities, in which various aspects of the present invention and following claimed subject matter may be illustrated.

Turning now to FIG. 4B, additional exemplary replication 274 is shown incorporating various aspects of the present invention and following claimed subject matter. Here again as before, components 252-258 are shown. In the depicted embodiment, the primary system is operational. The remote system is entering a DR mode for the primary system for a DR test procedure as initiated by the user 268. Accordingly, the applicable DR mode status (DR test entry event) is negotiated to the central replication management component 266 (again as denoted by arrow 272), and a firewall 270 to all incoming replication activity from the primary system is put in place.

The central replication management component 266 distributes the DR mode (again, e.g., DR test entry event) to all replication grid members in the remote system's replication grid. The primary system receives such notification and places its own firewall 276 over replication to the specific remote system. In the present scenario 274, if the primary system will try to replicate, the replication (as denoted by the large "X") would not be communicated to the remote system, but rather stopped at the primary system, and accumulated/queued for later retries. The user 268 may now backup on new objects at the remote system. Accordingly, object 6 is backed up on by the backup application 256 on the remote system as shown.

Figure 5A:
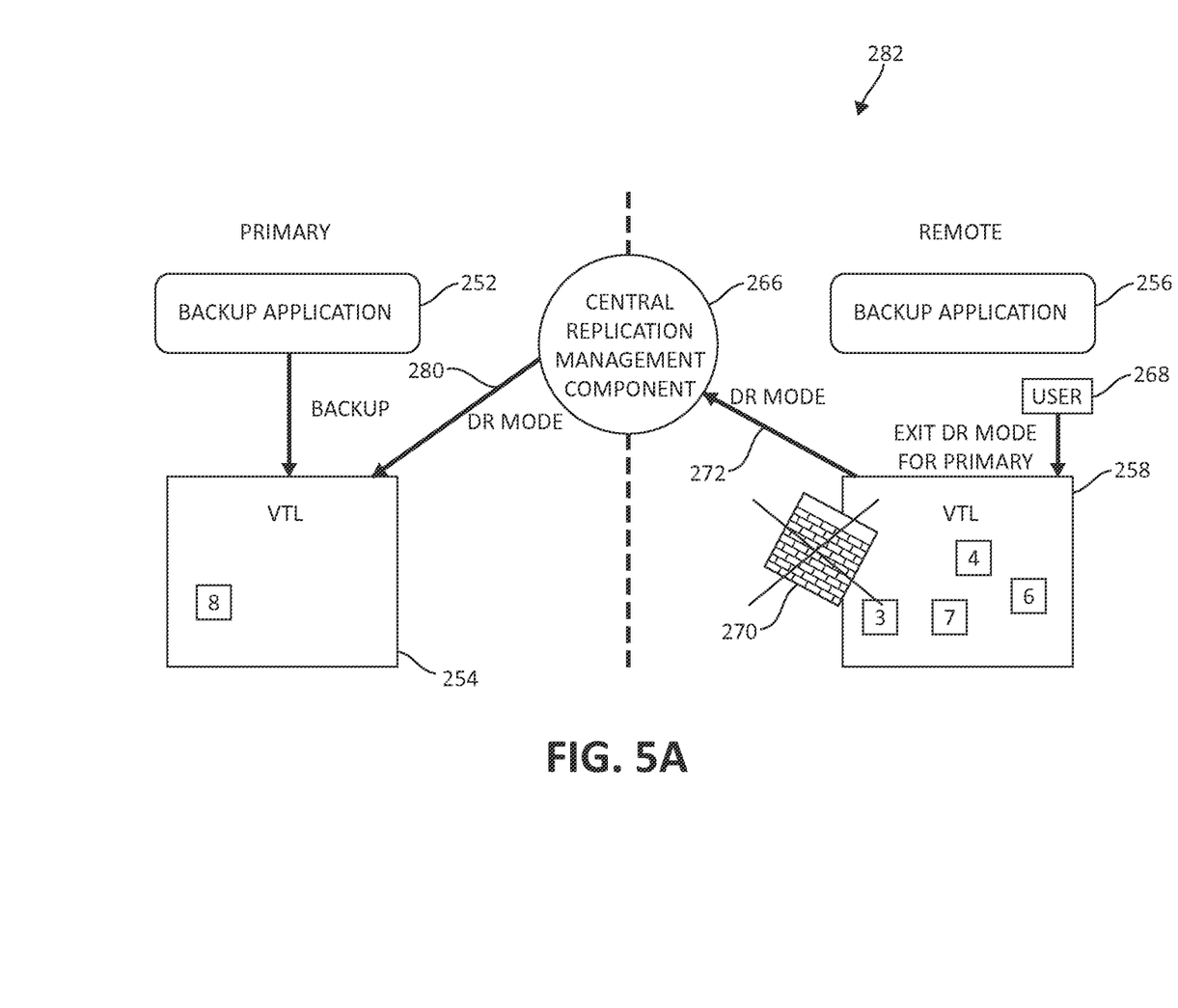
FIG. 5A illustrates additional exemplary replication between the two data storage facilities, in which various aspects of the present invention and following claimed subject matter may be illustrated.

Turning now to FIG. 5A, additional exemplary replication 282 is shown incorporating various aspects of the present invention and following claimed subject matter. Here again as before, components 252-258 are shown. In the depicted embodiment, a new primary system is put in place. The new primary system does not have its original data, or previous pending replication activities as the old system. The user 268 indicates to the remote system that it is stepping out of a DR mode for the specific primary system. The firewall 270 to the primary system is dropped (as indicated by the large "X"). Accordingly, the applicable DR mode status (applicable exit event) is negotiated to the central replication management component 266 (again as denoted by arrow 272), and is distributed by the component 266 to the rest of the grid members (e.g, as denoted by arrow 280).

Figure 5B:
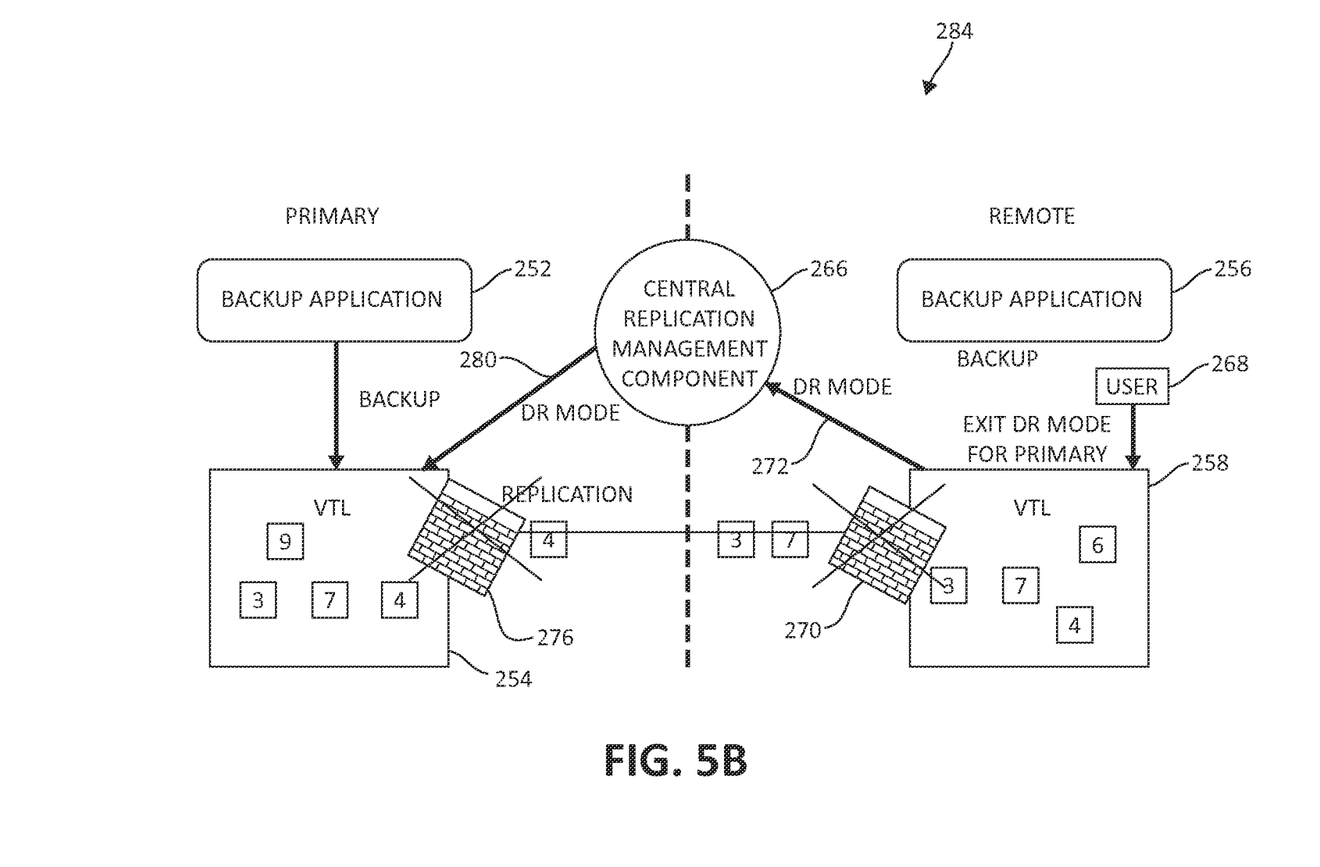
FIG. 5B illustrates additional exemplary replication between the two data storage facilities, in which various aspects of the present invention and following claimed subject matter may be illustrated.

Turning now to FIG. 5B, additional exemplary replication 284 is shown incorporating various aspects of the present invention and following claimed subject matter. Here again as before, components 252-258 are shown. In the depicted embodiment, the original primary system is in place with accompanying original data and pending replication activities as shown. The user 268 indicates to the remote system that it is stepping out of a DR mode for the specific primary system. The firewall 270 to the primary system is dropped (as indicated by the large "X"). Accordingly, the applicable DR mode status (applicable exit event) is negotiated to the central replication management component 266 (again as denoted by arrow 272), and is distributed by the component 266 to the rest of the grid members (e.g, as denoted by arrow 280).

The primary system receives such notification (as shown by arrow 280) and drops its own firewall 276 over replication to the specific remote system. In the present scenario 284, pending replication activities are retried and run, and objects 7 and 4 are replicated as shown. Backup operations commence on the primary system, and the primary system writes object 9 as shown.

Figure 6:
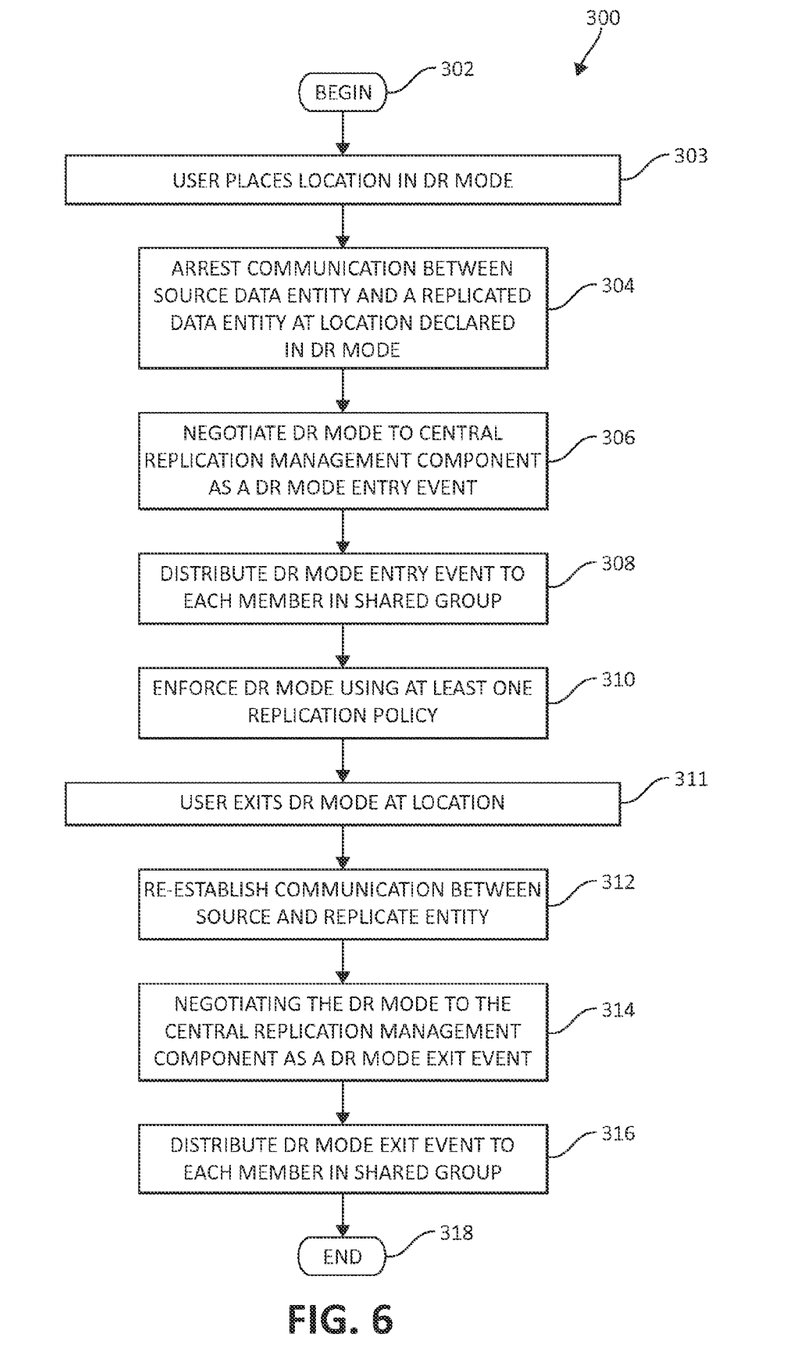
FIG. 6 illustrates an exemplary method for disaster recovery (DR) replication throttling in a deduplication system, again in which various aspects of the present invention may be implemented.

Turning now to FIG. 6, a flow chart diagram of an exemplary method 300 for disaster recovery (DR) replication throttling in a computing environment by a processor device is shown. Method 300 begins (step 302) with a user placing a particular replication location in a DR mode of operation (step 303). Communication between a source data entity and a replicated data entity is arrested at the location declared in the DR mode (step 304). The DR mode is negotiated to a central replication management component as previously described as a DR mode entry event (step 306). The DR mode entry even this then distributed by the central replication management component to each member in the shared replication grid (shared group). Once the DR mode is set, the DR mode is then enforced using at least one replication policy.

At a later time, the user then exits the applicable DR mode at the previously described location (step 311). Accordingly, communication is re-established between the source and replicate entity (step 312). The DR mode is negotiated to the central replication management component as an exit event (step 314), and the DR mode exit event is distributed to each member in the shared replication grid (again, e.g., shared group) (step 316). The method 300 then ends (step 318).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the one of ordinary skill in the art will appreciate that modifications and adaptations to those embodiments may be made without departing from the scope of the present invention as set forth in the following claims.

What is claimed is:

1. A system of disaster recovery (DR) replication throttling in a computing environment, comprising:
    at least one processor device, operable in the computing environment, wherein the processor devices are adapted for:
        sending, from a remote system including a replicated data entity, a request to a central replication management component to enter a DR mode as a result of a testing operation and negotiating the DR mode to the central replication management component as a DR mode entry event,
        arresting communication between a source data entity at a primary system and the replicated data entity at the remote system by configuring a first firewall at the remote system including the replicated data entity to all incoming replication activity from the source data entity,
        distributing, by the central replication management component, the DR mode entry event to each member in a shared group, and
        configuring a second firewall at the source data entity at the primary system, in response to receiving the DR mode entry event from the central replication management component.

2. The system of claim 1, wherein the at least one processor device is further adapted for, subsequent to the location exiting the DR mode:
    establishing the communication between the source and the replicated entity,
    negotiating the DR mode to the central replication management component as a DR mode exit event, and
    distributing, by the central replication management component, the DR mode exit event to each member in the shared group.

3. The system of claim 2, wherein the at least one processor device is further adapted for, pursuant to enforcing the DR mode using at least one replication policy, retaining requests for replication in a queue according to a retry status until the DR mode exit event is propagated to each member in the shared group.

4. The system of claim 1, wherein the at least one processor device is further adapted for registering, at the location, the declaration into the DR mode by a user.

5. The system of claim 4, wherein the at least one processor device is further adapted for registering a source system for the location declared in the DR mode, the source system inclusive of one of the source data entity and the replicated data entity.

6. The system of claim 1, wherein the at least one processor device is further adapted for, pursuant to distributing, by the central replication management component, the DR mode entry event to each member in the shared group, implementing a distribution mechanism for performing the distributing on a best-effort basis.

7. The system of claim 1, wherein the shared group is at least a portion of a replication grid.

8. The system of claim 1, wherein the at least one processor device is a storage management processor (SMP) device.

9. A computer program product for disaster recovery (DR) replication throttling in a computing environment by a processor device, the computer program product comprising a non-transitory computer-readable storage medium having computer-readable program code portions stored therein, the computer-readable program code portions comprising:
    a first executable portion for sending, from a remote system including a replicated data entity, a request to a central replication management component to enter a DR mode as a result of a testing operation and negotiating the DR mode to the central replication management component as a DR mode entry event;
    a second executable portion for arresting communication between a source data entity at a primary system and the replicated data entity at the remote system by
    configuring a first firewall at the remote system including the replicated data entity to all incoming replication activity from the source data entity;
    a third executable portion for distributing, by the central replication management component, the DR mode entry event to each member in a shared group; and
    a fourth executable portion for configuring a second firewall at the source data entity at the primary system, in response to receiving mode entry event from the central replication management component.

10. The computer program product of claim 9, further including, subsequent to the location exiting the DR mode:
    a fifth executable portion for establishing the communication between the source and the replicated entity,
    a sixth executable portion for negotiating the DR mode to the central replication management component as a DR mode exit event, and
    a seventh executable portion for distributing, by the central replication management component, the DR mode exit event to each member in the shared group.

11. The computer program product of claim 10, further including an eighth executable portion for retaining requests for replication in a queue according to a retry status until the DR mode exit event is propagated to each member in the shared group.

12. The computer program product of claim 9, further including a fifth executable portion for registering, at the location, the declaration into the DR mode by a user.

13. The computer program product of claim 12, further including a sixth executable portion for registering a source system for the location declared in the DR mode, the source system inclusive of one of the source data entity and the replicated data entity.

14. The computer program product of claim 9, further including a fifth executable portion for implementing a distribution mechanism for performing the distributing on a best-effort basis.

* * * * *